United States Patent
Ben-Tovim et al.

(10) Patent No.: US 7,583,266 B2
(45) Date of Patent: *Sep. 1, 2009

(54) SYSTEM AND METHOD FOR INTERACTIVE GROUPING OF PIE CHART SLICES

(75) Inventors: Yariv Ben-Tovim, Bellevue, WA (US); Liviu Asnash, Redmond, WA (US); Dany Hoter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/239,190

(22) Filed: Sep. 29, 2005

(65) Prior Publication Data

US 2006/0022981 A1    Feb. 2, 2006

Related U.S. Application Data

(63) Continuation of application No. 10/153,711, filed on May 21, 2002, now Pat. No. 6,972,762.

(51) Int. Cl.
*G06T 11/20* (2006.01)
(52) U.S. Cl. .................................... 345/440
(58) Field of Classification Search ................ 345/440, 345/440.2; 715/968
See application file for complete search history.

(56) References Cited

U.S. PATENT DOCUMENTS

| | | | | |
|---|---|---|---|---|
| 4,661,810 A * | 4/1987 | Himelstein et al. | ......... | 715/860 |
| 5,408,603 A * | 4/1995 | Van de Lavoir et al. | ..... | 715/763 |
| 5,491,779 A * | 2/1996 | Bezjian | ...................... | 345/440 |
| 5,542,040 A * | 7/1996 | Chang et al. | ................ | 715/776 |
| 5,544,267 A * | 8/1996 | Mahoney et al. | ............ | 382/317 |
| 5,559,527 A * | 9/1996 | Quinn | ....................... | 455/67.7 |
| 5,734,888 A * | 3/1998 | Li et al. | ......................... | 707/4 |
| 5,823,783 A * | 10/1998 | Adams | ........................ | 434/208 |
| 5,844,572 A * | 12/1998 | Schott | ......................... | 345/440 |
| 5,917,499 A * | 6/1999 | Jancke et al. | ................ | 345/440 |
| 6,035,285 A * | 3/2000 | Schlect et al. | ................ | 705/30 |
| 6,070,175 A * | 5/2000 | Mezei | ........................ | 715/500 |
| 6,188,403 B1 * | 2/2001 | Sacerdoti et al. | ............ | 715/764 |
| 6,385,611 B1 * | 5/2002 | Cardona | ........................ | 707/6 |
| 6,727,106 B1 * | 4/2004 | Ankutse et al. | ................ | 438/5 |
| 6,772,034 B1 * | 8/2004 | Shi et al. | ..................... | 700/121 |
| 6,839,713 B1 * | 1/2005 | Shi et al. | ..................... | 707/101 |

OTHER PUBLICATIONS

PoPieChart, Jul. 27, 2001, Caltech, found at http://www.cacr.caltech.edu/resources/origin2000/SystemSoftware/docs/TGS/ref/popiechart_desc.html.*

* cited by examiner

*Primary Examiner*—Jeffery A Brier
(74) *Attorney, Agent, or Firm*—Merchant & Gould; Ryan T. Grace

(57) ABSTRACT

Described is a system and method for grouping elements whose data falls below a grouping threshold, and for displaying the grouped elements as a single portion of a graphical chart. Briefly stated, the system and method allow a user to dynamically increase a grouping threshold from a default value to an adjusted value. The data for each elements falling below the adjusted grouping threshold is aggregated. The grouped elements are then displayed as a single slice with a value of the aggregated data rather than being displayed as individual slices. In this way, the important information, which normally means the bigger and more significant slices, is more clearly visible. Further more, a single label may be associated with the group, thereby eliminating problems associated with the layout of multiple labels for each individual grouped element.

20 Claims, 5 Drawing Sheets

SYSTEM AND METHOD FOR INTERACTIVE GROUPING OF PIE CHART SLICES

This application is a continuation of application Ser. No. 10/153,711, filed May 21, 2002, now U.S. Pat. No. 6,972,762 the benefit of the earlier filing date is hereby claimed under 35 U.S.C. §120.

BACKGROUND OF THE INVENTION

One of the biggest factors considered in the design and development of software applications is ease of use. Often the difference between a successful software application and an unsuccessful software application is decided by the user's experience in interacting with it. Because of this, software developers generally strive to simplify the user's experience.

One particularly competitive segment of the software industry is data analysis software. Data analysis software deals with analyzing data and presenting the data to the user in a meaningful way. Typically, data analysis software includes mechanisms to generate graphical representations of the data, such as pie charts, bar charts, line graphs, and the like. Some data analysis software includes rich features to ensure that those graphical representations convey as much information about the underlying data as possible. For example, data analysis software that generates pie charts may include the ability to alter the color of the pie slices, change the size of the pie chart, modify the layout of labels, and alter other visual features of the pie chart. Each of these attributes is intended to allow the user to graphically display information about underlying data in the most meaningful way possible.

Sometimes, the data underlying the graphical representation is not all equally important to the user. This may be especially true in the case of pie charts. In some cases, a pie chart may display data associated with very many elements of data but the pie chart is dominated by a relatively small number of elements. For example, in a series of 10 or more elements, as few as two or three may make up 80 percent or more of the pie chart, with the remaining elements being displayed as very small slices. Typically, the user is most interested in the elements of data that dominate the overall presentation, and is less interested in the smaller elements. In cases like this, the smaller slices of the pie chart, which represent the smaller elements, are more distracting to the user than informative. However, at least in the case of a pie chart, those smaller elements cannot be simply eliminated because to do so would skew the overall presentation. In addition, labels are difficult to place on such a pie chart because an appealing layout for the few dominant slices may result in a less than satisfactory layout for the remaining slices. For the purpose of this discussion, the term "element" refers to a data entry that ordinarily results in a slice on the pie chart.

Users today have few options to address these issues. For instance, a user may modify the data entries themselves to make the pie chart more visually appealing, such as by manually combining less interesting elements from the data. Another option for the user would be setting a threshold that will remove the smaller slices from the pie. While doing so, the user is also changing the proportion of the remaining slices to the whole. However, these solutions do not make the user experience pleasant or it distorts the data. Unfortunately, an acceptable solution to these issues has eluded those skilled in the art.

SUMMARY OF THE INVENTION

The present invention is directed at a system and method for grouping elements whose data falls below a grouping threshold, and displaying the grouped elements as a single portion of a graphical chart. Briefly stated, the system and method allow a user to dynamically increase a grouping threshold from a default value to an adjusted value. The data for each elements falling below the adjusted grouping threshold is aggregated. The grouped elements are then displayed as a single slice with a value of the aggregated data rather than being displayed as individual slices. In this way, several smaller slices may be displayed as a group, thereby eliminating the distraction of having smaller elements dispersed among elements of greater value.

DETAILED DESCRIPTION OF THE PREFERRED EMBODIMENT

Figure 1:
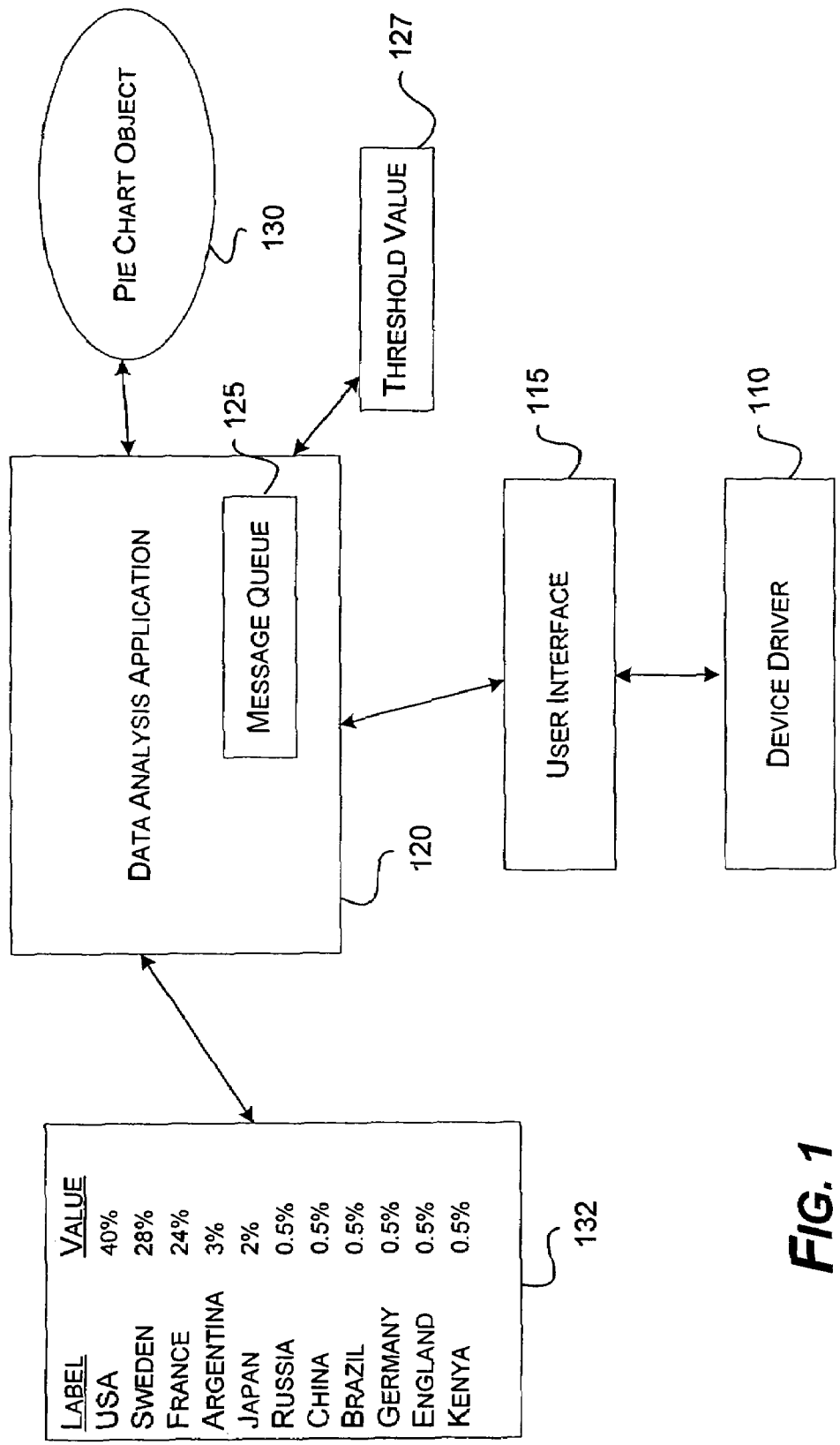
FIG. 1 is a functional block diagram illustrating components of a software environment in which the present invention may be implemented.

FIG. 1 is a functional block diagram illustrating components of a software environment in which the present invention may be implemented. Shown in FIG. 1 is a data analysis application 120 that includes analytical functions as well as other functions to enable a user to manipulate and understand data. In one example, the data analysis application 120 may be a spreadsheet application or the like. One function of the data analysis application may be to create images that graphically represent data. For instance, tables of numerical data, such as tabular data 132, may not convey meaningful information to a user until the data is presented in a graphical way. Bar charts, line charts, pie charts, and the like are typical graphical representations of data. In this implementation, the data analysis application 120 is configured to generate a pie chart from tabular data 132. FIG. 1 illustrates the pie chart as a pie chart object 130 having many properties associated with the pie chart. Those properties may include a size of the pie chart, colors associated with each slice, various labels that may be shown on the pie chart, and an origin. The data analysis application 120 includes mechanisms, described in greater detail below, for modifying the properties of the pie chart object 130, including the number of slices and parameters of each slice.

Figure 2:
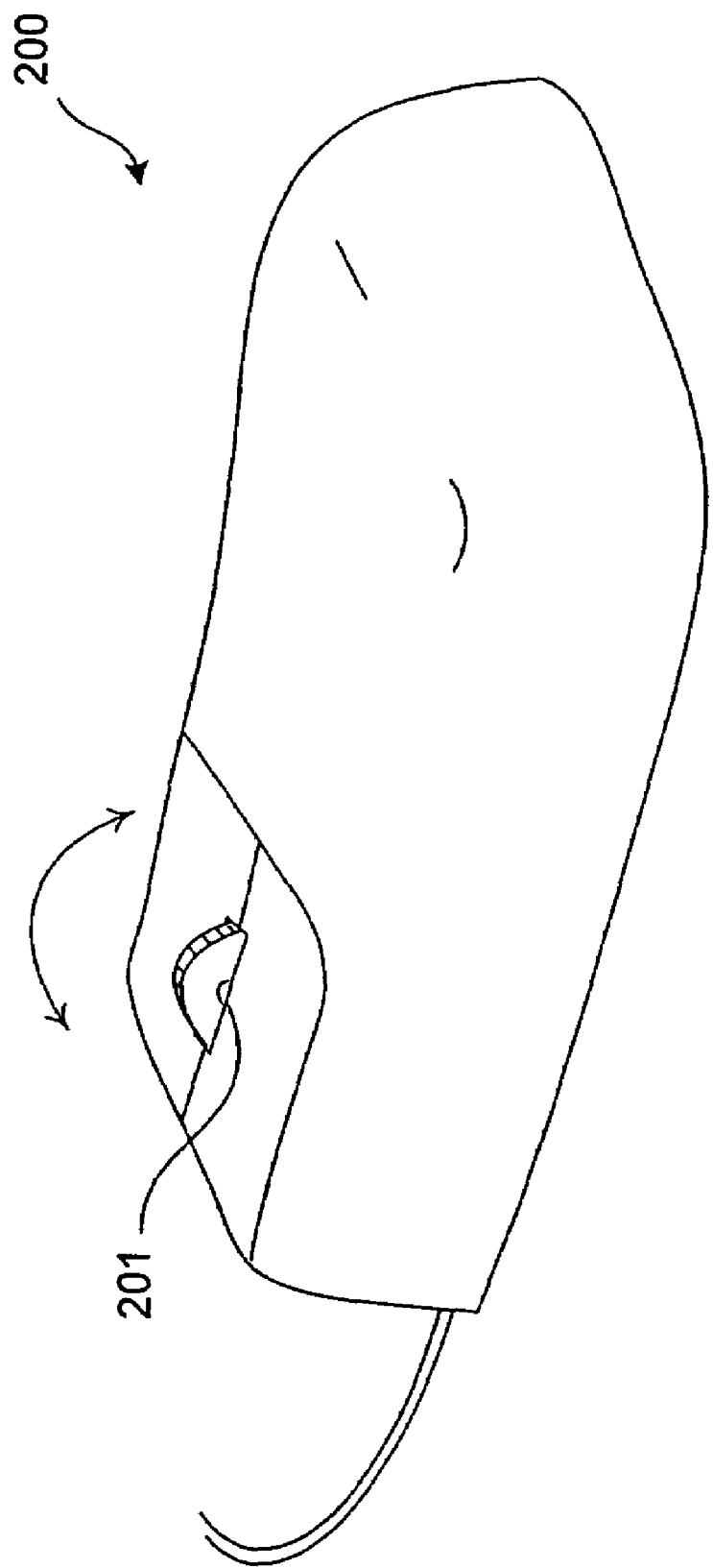
FIG. 2 is a graphical representation of an input device having a rotational input mechanism, as may be used in implementations of the invention.

Also shown in FIG. 1 is a device driver 110 associated with an input device. In this described embodiment, the input device may be a keyboard, a computer mouse, or similar input device. In a preferred implementation, at least one input device has a rotational input mechanism. Turning briefly to FIG. 2, a conventional computer mouse 200 is illustrated that may be used in implementations of the invention. As will be appreciated by those skilled in the art, the mouse 200 shown includes a rotational input mechanism (e.g., a wheel) 201. Such a conventional wheel mouse 200 typically is used to scroll documents up and down in a software application, such as word processing documents or the like. As will be appreciated, if the wheel 201 is rotated in either direction, a signal is issued to the device driver 110 by the mouse 200. The signal indicates the direction in which the wheel 201 was rotated and the amount of the rotation. Other signals may also be issued by the mouse 200, such as to indicate movement of the mouse 200 or the pressing of one or more buttons on the mouse 200.

Returning to FIG. 1, signals from the input device are received by the device driver 110. In the case where the device driver 110 corresponds to a wheel mouse, such as the one illustrated in FIG. 2, typical signals may indicate that the mouse is moving in one or more directions, that a button on the mouse has been pressed, or that the rotational input mechanism has been rotated. In the case where the input device is a keyboard, typical signals indicate which of several keyboard keys has been pressed, or which combination of keys. In response to such a signal, the device driver 110 is typically configured to indicate the existence of the signal to an operating system, often referred to as "firing" or "raising" an "event." The operating system may then handle the event in any conventional manner. Often, in the case of input device drivers, a user interface module 115 retrieves the signal from the device driver 110 and then makes the signal available to other software modules that have indicated an interest in the particular event raised.

Most software applications, such as the data analysis application 120, receive user input events, including those received from a mouse or keyboard. Typically, software applications include a message queue 125 into which the user interface module 115 posts signals from input devices. In the current example, a signal from an input device, such as the wheel mouse or keyboard, is received by the device driver 110, retrieved from the device driver 110 by the user interface module 115, and posted to the message queue 125 of the data analysis application 120. At that point, the data analysis application 120 may handle the message in any practical way. Certain signals in the message queue 125 are interpreted as modifying another signal in the message queue 125. For instance, the existence of a Ctl_Down signal (meaning that a control key on the keyboard has been pressed) in the message queue 125 may cause a subsequently-received signal, such as a Wheel_Rotate signal (meaning that the wheel of the mouse has been rotated), to be interpreted differently than its default manner.

Also shown in FIG. 1 is a data field that stores a value for a grouping threshold 127. In accordance with the invention, the data analysis application 120 is configured to group data elements from tabular data 132 into a single group slice when displayed by pie chart object 130. The criteria that determines whether an element is displayed as a unique slice or as part of the group slice is whether the value of the element data exceeds the grouping threshold 127. In other words, element data having a value above the grouping threshold 127 are displayed as unique slices in the pie chart. Element data having a value below the grouping threshold 127 are aggregated and the aggregate value is displayed as a single slice of the pie chart. In further accordance with the invention, the value of the grouping threshold 127 may be dynamically modified, even while the user is viewing the displayed pie chart. The data analysis application 120 responds to messages in the message queue 125 that indicate a change of the grouping threshold by dynamically modifying the grouping threshold and causing the pie chart object 130 to redraw the pie chart based on the new grouping threshold. In a preferred implementation, the dynamic modification and redrawing may occur while the user is interacting with (e.g., viewing) the pie chart. In other words, while the user is viewing the pie chart, the user may issue input messages (e.g., mouse or keyboard commands) that dynamically cause slices of the pie chart to be grouped and displayed as a single slice. More user inputs may add additional elements to the group slice or remove elements from the group slice. In this way, the user experience of creating visually pleasing pie charts that display meaningful information is enhanced.

Figure 3:
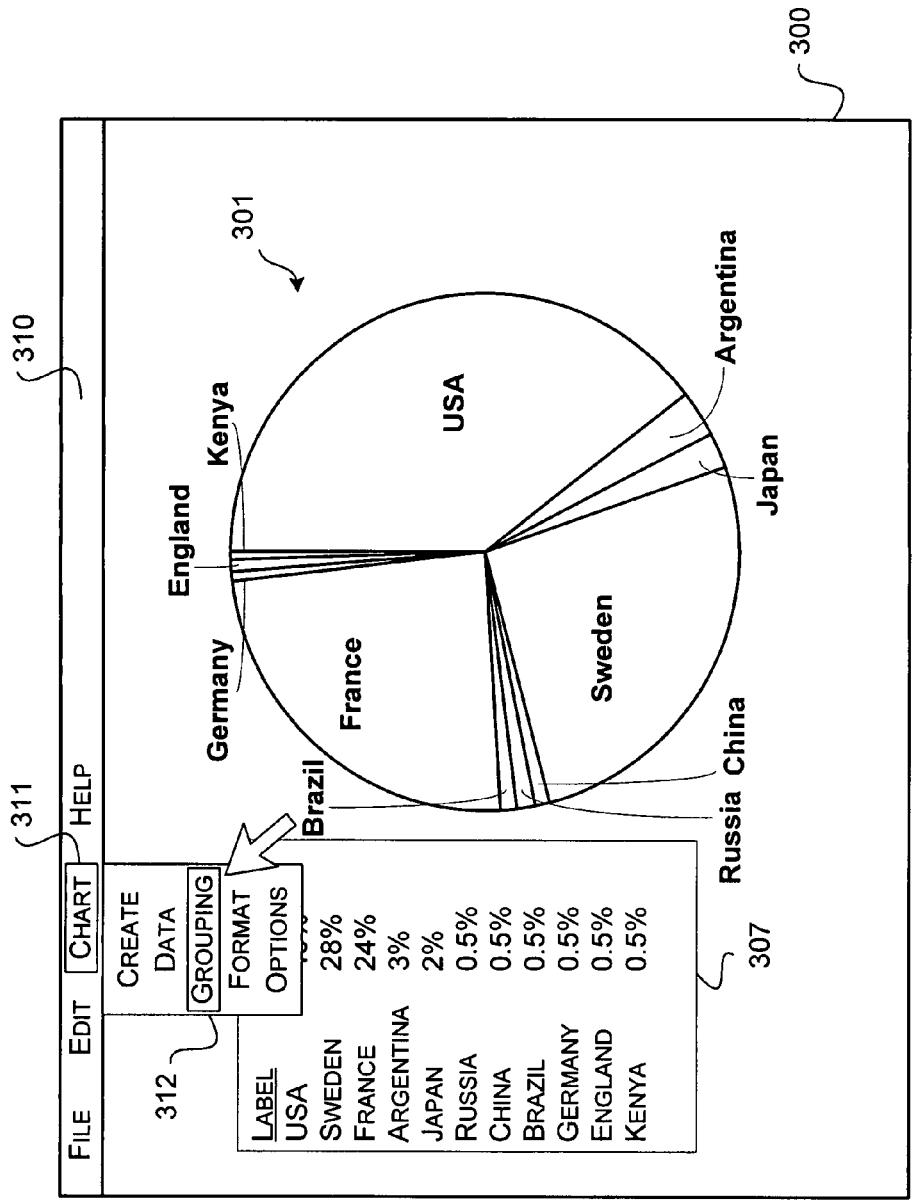
FIG. 3 is an illustrative screen shot of a user interface that may be presented by the data analysis application of FIG. 1, displaying a pie chart with a group of elements each displayed as single slices, in accordance with one implementation of the invention.
Figure 4:
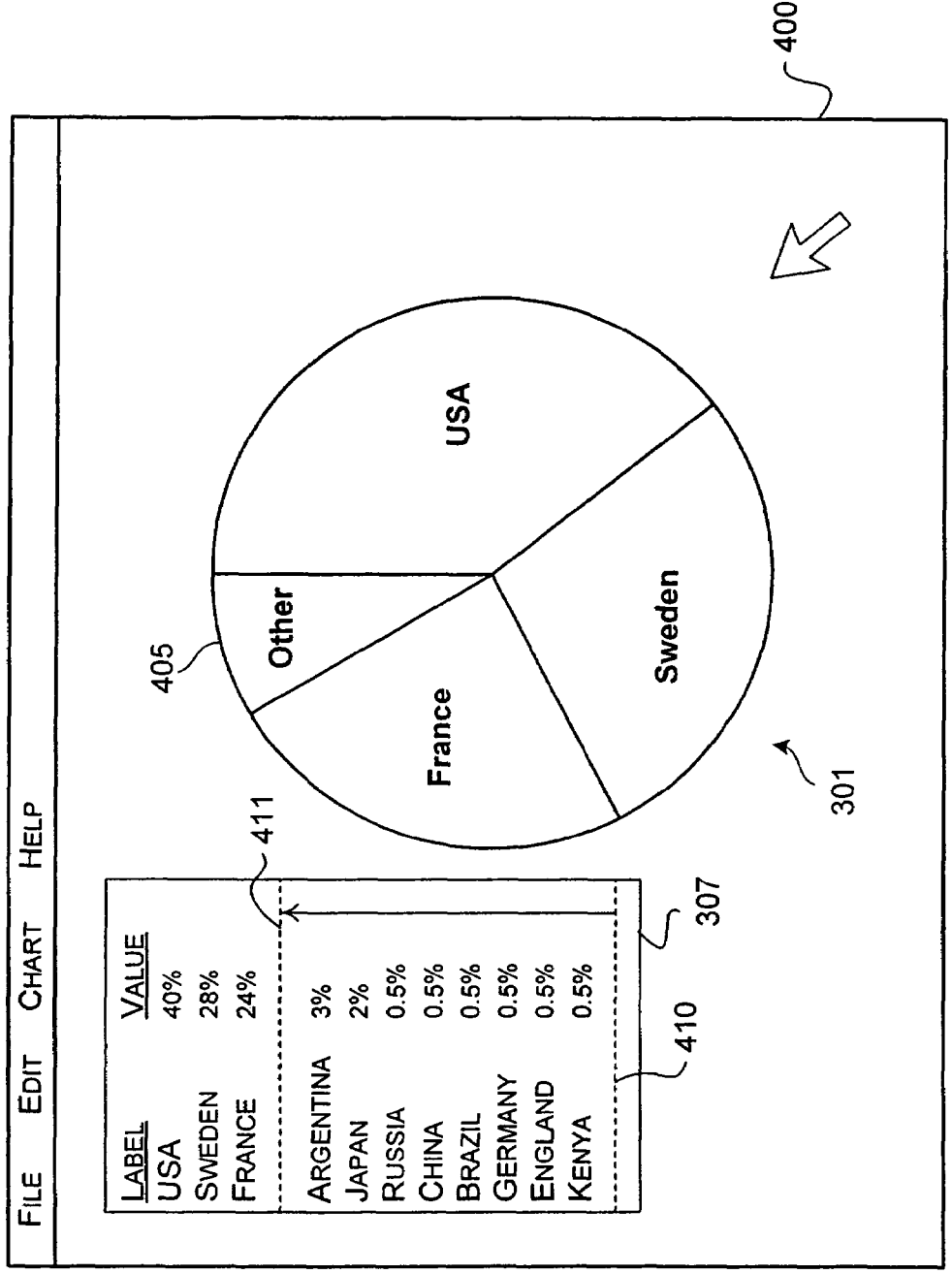
FIG. 4 is another illustrative screen shot of the user interface presented by the data analysis application of FIG. 1, displaying a pie chart with a group of elements displayed as a single slice, in accordance with one implementation of the invention.

FIGS. 3 and 4 are illustrative screen shots of a user interface that may be presented by the data analysis application 120 shown in FIG. 1. Shown in FIG. 3 is a window 300 with a pie chart 301. As will be appreciated, the pie chart 301 may be a graphical representation of tabular data 307 maintained by the data analysis application. The pie chart 301 is composed of several slices, each slice proportionally representing its associated data. For instance, a first slice, labeled "USA," is displayed corresponding to an element in the tabular data 307 having the label "USA" and a value of 40 percent. Another slice, labeled "Sweden," is displayed in association with an element in the tabular data 307 having the label "Sweden" and a value of 28 percent. A third slice, labeled "France," is displayed in association with an element in the tabular data 307 having the label "France" and a value of 24 percent.

Other slices, such as England and Japan, are also displayed in the pie chart in association with the remaining elements in the tabular data 307. Each of the remaining elements has a value significantly below the value of each of the three largest elements. For that reason, the value to the user of any information associated with the smaller slices is likely outweighed by the visual distraction caused to the lager elements. Thus, the pie chart 301 illustrated in FIG. 3 is a representation of one problem that conventional data analysis applications have failed to overcome.

Also associated with the window 300 is a menu bar 310 having a Chart option 311 and a Grouping sub-option 312. In accordance with one implementation of the invention, the grouping threshold of the pie chart 301 may be modified by activating the Grouping sub-option 312, thereby invoking another input window (not shown). An input selection mechanism or field on that other input window may be used to modify the grouping threshold. However, that process, although effective, detracts from the user experience by taking the user's attention away from the pie chart 301. In accordance with another implementation of the invention, activating a rotational input mechanism, such as the wheel of a computer mouse, causes the data analysis application to dynamically modify the grouping threshold of the pie chart 301.

Referring now to FIG. 4, a group slice 405 may be created in response to an input signal that indicates a change to the grouping threshold. As mentioned above, the grouping threshold may have a default value. It is envisioned that the default value will be low enough (e.g., zero) that all of the elements of the tabular data 307 will be displayed in unique slices of the pie chart 301 (as shown in FIG. 3). Accordingly, the default value of the grouping threshold is illustrated as a dashed line 410 below the lowest-valued element of the tabular data 307. However, in response to an input signal indicating a modification (e.g., an increase) of the grouping threshold, the value of the grouping threshold may be increased. The increased grouping threshold is indicated in FIG. 4 as a second dashed line 411 above the highest element in the tabular data 307 that has a value below the grouping threshold. In this example, the input signal may cause the default grouping threshold to be increased from zero (corresponding to dashed line 410) to some value above 3 percent (corresponding to dashed line 411). In this way, each of the elements having values below the new grouping threshold (dashed line 411) are aggregated and displayed as a single group slice 405 having the label "Other." In this way, the several smaller elements do not detract from the larger slices of the pie chart.

In the preferred implementation of the invention, the input signal may be generated by activating a rotational input mechanism (e.g., a mouse wheel) while viewing the pie chart 301. A modifier key, such as the Control (Ctrl) key on a keyboard, may also be used to distinguish the particular input signal as one affecting the grouping threshold. Accordingly, while viewing the pie chart 301, the user may simply hold down the Ctrl key and rotate the mouse wheel in one direction to increase the grouping threshold such that elements are combined into the group slice 405. It is envisioned that some incremental value will be either added to or subtracted from the grouping threshold corresponding to an incremental change in the rotational input mechanism. In short, the more the user turns the mouse wheel in one or the other direction, the more the grouping threshold is increased or decreased. By increasing the grouping threshold, more elements are added to the group slice 405. By decreasing the grouping threshold, elements are removed from the group slice 405 and again displayed as individual slices. It will be appreciated that the pie chart 301 may be redrawn in response to each incremental change in the grouping threshold to provide the user with instant feedback on what the pie chart 301 will look like with the grouping threshold at the current value.

Note that in this preferred implementation, the user need not select any menu items nor activate any other input window to modify the grouping threshold. By allowing direct and dynamic manipulation of the grouping threshold, the invention improves the user's experience, providing the data analysis application with a competitive advantage.

Although described here in the context of a wheel mouse, it will be appreciated that other input devices, such as trackballs, may work suitably well also. Other alternatives may also become apparent to skilled artisans.

Figure 5:
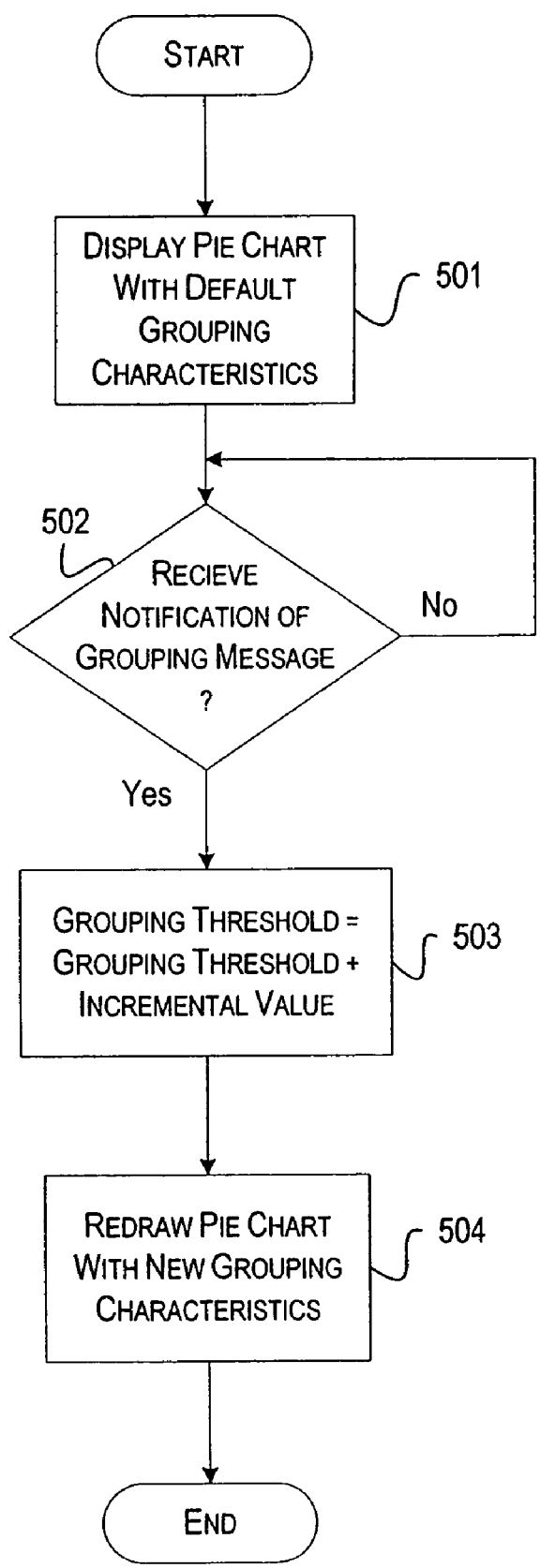
FIG. 5 is a logical block diagram generally illustrating a process for grouping elements for display as a single slice of a pie chart, in accordance with one implementation of the invention.

FIG. 5 is a logical block diagram generally illustrating a process 500 for grouping elements into a group slice for display in a pie chart. The process 500 enters where a data analysis application includes tabular data containing a plurality of elements for representation in a pie chart, and the pie chart is ready for display. Processing begins at step 501.

At step 501, the process draws the pie chart to a display window of the data analysis application. As shown in FIG. 3, the display may take the form of a window having a graphical representation of the pie chart. The pie chart is drawn with unique slices for each element of the tabular data that exceeds a grouping threshold. When first drawn, the pie chart may have unique slices for each element that exceeds a default grouping threshold, which may be zero or some other predetermined value.

At step 502, the process idles until an instruction is received to modify the grouping threshold (a "grouping instruction"). In one implementation, the grouping instruction may correspond to a signal generated by an input device having a rotational input mechanism. One example of such an input device is the conventional wheel mouse illustrated in FIG. 2. The signal generated is an indication that the rotational input mechanism has experienced a rotation, such as by a user pressing a Ctrl key on the keyboard while turning the wheel of the wheel mouse. The signal may also include a direction of the rotation, if applicable. One alternative signal may be generated by the rotation of a ball within a trackball. Other alternatives also exist and will be apparent to those skilled in the art. It will also be appreciated that although the process 500 idles at step 502, many other tasks may be performed by the data analysis application unrelated to the grouping of elements in the pie chart. If the grouping instruction is detected, the process moves to step 503.

At step 503, the grouping threshold is modified based on the grouping instruction. As mentioned, in one implementation the grouping instruction includes a direction of rotation of the rotational input mechanism. Based on that information, the current value of the grouping threshold may be either increased or decreased. The amount by which the grouping threshold is modified may be based on an incremental value associated with each incremental rotation of the rotational input mechanism. For instance, one incremental rotation of a mouse wheel may correspond to an increase of 10 units of measure. Each unit of measure may be based on the particular units associated with the tabular data, the fractional percentage of the pie chart, or the visual size of each displayed slice (e.g., the area of a slice or the number of pixels used to display a slice).

For example, the data analysis application may increase the grouping threshold from zero to a given value, indicating that any element whose displayed size does not exceed the given value will be included in the group slice. Each incremental rotation of the mouse wheel then results in the grouping threshold being increased another incremental value until an acceptable appearance of the pie chart results. Rotating the mouse wheel in the opposite direction may decrease the grouping threshold by the same incremental value. The incremental value may be predefined or user selectable. It will be appreciated that as a user continues to rotate the wheel of the mouse, multiple signals may be generated for each predetermined increment by which the wheel is rotated. The incremental value (or gradient) may be repeatedly applied for each rotational increment experienced. Once the grouping threshold has been properly modified, the process 500 continues to step 504.

Another example might be in the case where the threshold is defined as the displayed size of the slice outer arc. In this case, when the pie has a certain size, some of the slices are under the threshold and are grouped while others are drawn individually. When the user resizes the pie to a bigger size, the arc size of each slice is enlarged. This results in some of the slices going over the threshold and out of the grouped slices.

At step 504, the data analysis application redraws the pie chart with each element not exceeding the current grouping threshold aggregated in to a single group slice, and the process 500 ends. It will be appreciated that the process shown allows a user to group elements into a group slice without resort to a separate input window. It will be appreciated that the system and method enabled by the present invention simplifies interaction with the data analysis application, thereby improving the user's experience and creating a competitive advantage.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for displaying a graphical representation of data, comprising:
    displaying a graphical representation of the data, wherein the graphical representation includes unique portions that represent elements of the data;
    providing a grouping threshold, wherein the grouping threshold is a value set on a computing device;
    in response to receiving a grouping instruction signal from an input device while displaying the graphical representation of data, automatically aggregating at least two elements that have values below the grouping threshold while elements above the grouping threshold are not aggregated; and
    redisplaying the graphical representation with the at least two aggregated elements sharing a common portion of the graphical representation while elements that are not aggregated maintain respective unique portions of the graphical representation.

2. The computer-implemented method of claim 1, wherein the graphical representation includes a pie chart.

3. The computer-implemented method of claim 2, wherein the unique portions of the graphical representation include slices of the pie chart.

4. The computer-implemented method of claim 2, wherein the unique portions of the graphical representation include slices of the pie chart associated with each of the elements of data.

5. The computer-implemented method of claim 1, wherein the input device includes a wheel, and the signal is associated with the rotation of the wheel.

6. The computer-implemented method of claim 1, wherein the graphical representation includes a chart.

7. The computer-implemented method of claim 1, wherein the input device includes a keyboard.

8. The computer-implemented method of claim 1, wherein the grouping threshold is modifiable by a rotation of a wheel of a mouse device.

9. A computer-readable medium having computer-executable instructions stored on the computer-readable medium, wherein the computer-executable instructions stored on the computer-readable medium cause a computer to execute and display a chart by causing at least a portion of a computer to perform steps, comprising:
    obtaining an indication that a grouping threshold has been modified, wherein the indication is obtained from a signal issued by an input device;
    in response to obtaining the indication that the grouping threshold has been modified while displaying the chart, automatically causing the computer to determine which of a plurality of elements have values below the modified grouping threshold;
    aggregating the plurality of elements that have values below the modified grouping threshold, while elements that have values above the grouping threshold are not aggregated; and
    displaying the chart with the elements below the grouping threshold having an aggregated portion of the chart while elements above the grouping threshold maintain respective unique portions of the chart.

10. The computer-readable medium of claim 9, wherein the chart includes a pie chart.

11. The computer-readable medium of claim 9, wherein the input device includes a wheel and the signal is associated with the rotation of the wheel.

12. The computer-readable medium of claim 9, wherein the graphical representation includes a chart.

13. The computer-readable medium of claim 9, wherein the input device includes a keyboard.

14. The computer-readable medium of claim 9, wherein the grouping threshold is modifiable by a rotation of a wheel of a mouse device.

15. A computer-implemented method for displaying elements of data in a chart, comprising:
    displaying the chart with each of the elements being represented by a unique portion of the chart;
    obtaining a modification to a grouping threshold, wherein the modification is obtained from a signal issued by an input device;
    in response to obtaining the modification while displaying the chart, automatically causing a computing device to aggregate elements that have values below the grouping threshold, while elements that have values above the grouping threshold are not aggregated; and
    displaying an aggregated chart having at least two elements below the grouping threshold sharing a portion of the chart while elements above the grouping threshold maintain respective unique portions of the chart.

16. The computer-implemented method of claim 15, wherein the chart and the aggregated chart include pie charts.

17. The computer-implemented method of claim 15, wherein obtaining a modification in a grouping threshold includes a signal from an input device.

18. The computer-implemented method of claim 15, wherein the chart is a pie chart.

19. The computer-implemented method of claim 15, wherein the input device includes a keyboard.

20. The computer-implemented method of claim 15, wherein the grouping threshold is modifiable by a rotation of a wheel of a mouse device.

* * * * *